United States Patent
Chen et al.

(10) Patent No.: US 8,971,317 B2
(45) Date of Patent: Mar. 3, 2015

(54) METHOD FOR CONTROLLING DATA STREAM SWITCH AND RELEVANT EQUIPMENT

(71) Applicant: Huawei Technologies Co., Ltd., Shenzhen (CN)

(72) Inventors: Zhiyun Chen, Chengdu (CN); Xing Hu, Shenzhen (CN); Jianlin Zhou, Shenzhen (CN)

(73) Assignee: Huawei Technologies Co., Ltd., Shenzhen (CN)

(*) Notice: Subject to any disclaimer, the term of this patent is extended or adjusted under 35 U.S.C. 154(b) by 112 days.

(21) Appl. No.: 13/930,807

(22) Filed: Jun. 28, 2013

(65) Prior Publication Data
US 2013/0287017 A1    Oct. 31, 2013

Related U.S. Application Data

(63) Continuation of application No. PCT/CN2011/083030, filed on Nov. 28, 2011.

(51) Int. Cl.
*H04L 12/947* (2013.01)
*H04L 12/937* (2013.01)
*H04L 12/931* (2013.01)

(52) U.S. Cl.
CPC .............. *H04L 49/25* (2013.01); *H04L 49/253* (2013.01); *H04L 49/50* (2013.01)
USPC .......................................... 370/355; 370/360

(58) Field of Classification Search
CPC ....... H04L 49/10; H04L 49/103; H04L 49/25; H04L 49/50; H04L 49/253
USPC ......... 370/351, 352, 355, 357, 360, 366, 389, 370/394, 395.1, 395.4, 395.41
See application file for complete search history.

(56) References Cited

U.S. PATENT DOCUMENTS

| 6,628,609 B2 | 9/2003 | Chapman et al. | |
| 6,865,179 B1 * | 3/2005 | Cao .............................. | 370/352 |
| 2005/0063370 A1 * | 3/2005 | Beshai et al. .................. | 370/360 |

FOREIGN PATENT DOCUMENTS

| CN | 101272345 A | 9/2008 |
| EP | 1233580 A1 | 8/2002 |
| EP | 2237507 A1 | 10/2010 |

OTHER PUBLICATIONS

International Search Report issued in corresponding PCT Patent Application No. PCT/CN2011/083030, mailed Sep. 6, 2012, 11 pages.

*Primary Examiner* — Obaidul Huq
(74) *Attorney, Agent, or Firm* — Brinks Gilson & Lione

(57) ABSTRACT

Embodiments of the present disclosure disclose a method for controlling data stream switch and a relevant equipment. The method includes: obtaining bandwidth demand information of a data stream; calculating a BWM according to the bandwidth demand information, the physical bandwidth of at least one ingress port and at least one egress port of the data stream, and TDM service bandwidth information; performing sequencing on entries of the BWM, to obtain a bandwidth sequencing information table; performing cell even sequencing processing on the data stream according to the bandwidth sequencing information table, to obtain a cell table; and controlling, sending of cells of the data stream according to the cell table. Through the solutions provided, processing complexity may be effectively reduced, the problem of scale limitation on a bufferless switch structure is solved, and meanwhile, a delay jitter during switch processing is also decreased.

10 Claims, 6 Drawing Sheets

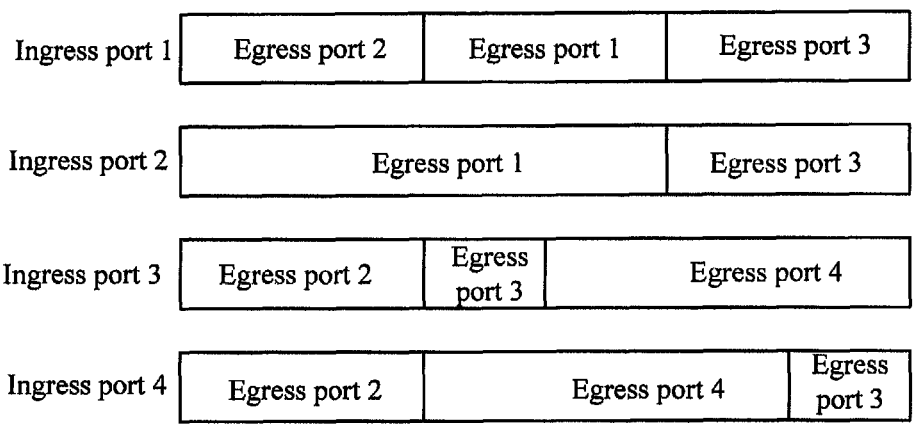
FIG. 3-a
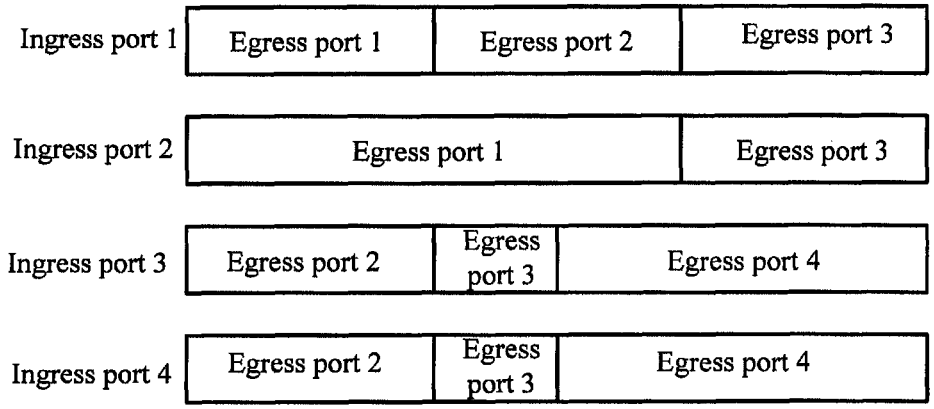
FIG. 3-b

| Ingress port 1 | Egress port 1 | Egress port 2 | Egress port 3 |
|---|---|---|---|
| Ingress port 2 | Egress port 3 | Egress port 1 | |
| Ingress port 3 | Egress port 2 | Egress port 3 | Egress port 4 |
| Ingress port 4 | Egress port 4 | Egress port 3 | Egress port 2 |

FIG. 3-c

Switch period

| First time slot of the first array | First time slot of the fifth array | First time slot of the third array | First time slot of the seventh array | First time slot of the second array | First time slot of the sixth array | First time slot of the fourth array | First time slot of the eighth array | Second time slot of the first array | Second time slot of the fifth array | Second time slot of the third array | Second time slot of the seventh array | Second time slot of the second array | Second time slot of the sixth array | Second time slot of the fourth array | Second time slot of the eighth array |

FIG. 4-a

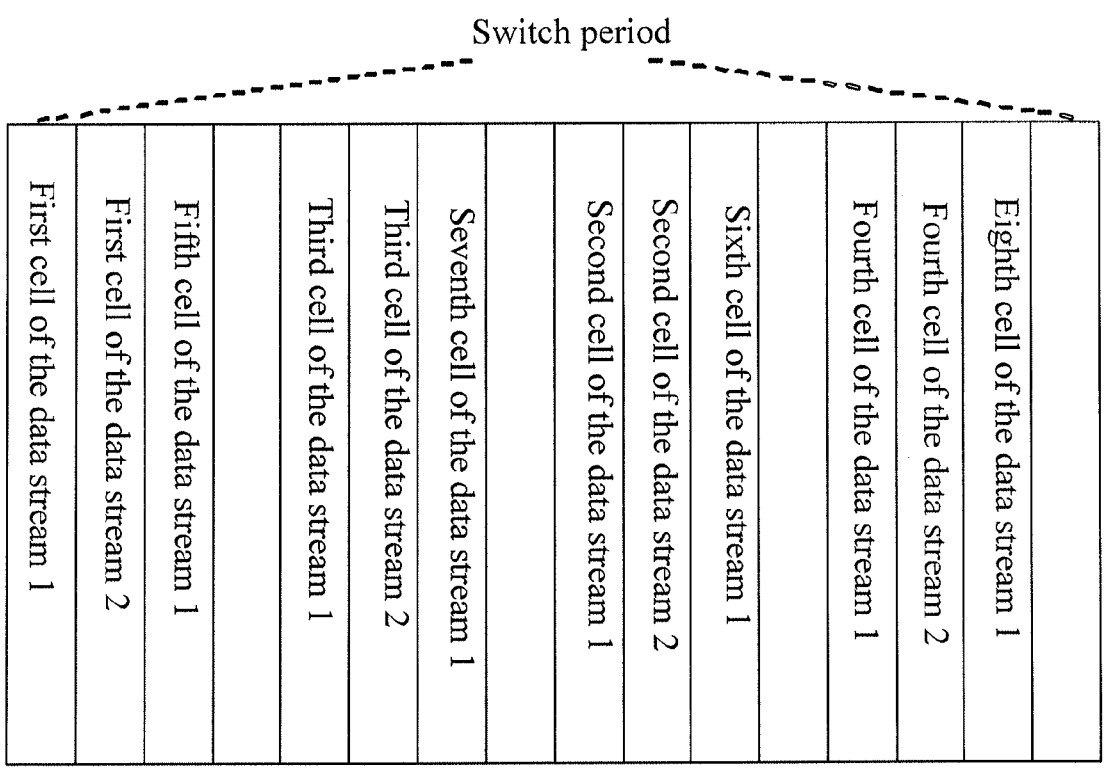
FIG. 4-b

METHOD FOR CONTROLLING DATA STREAM SWITCH AND RELEVANT EQUIPMENT

CROSS-REFERENCE TO RELATED APPLICATIONS

This application is a continuation of International Application No. PCT/CN2011/083030, filed on Nov. 28, 2011, which is hereby incorporated by reference in its entirety.

FIELD

The present disclosure relates to the field of communications, and in particular, to a method for controlling data stream switch and a relevant equipment.

BACKGROUND

The mobile communication network is developing towards all-IP (ALL-IP). Internet protocol (IP, Internet Protocol) technologies will be applied to every layer of a mobile network. Therefore, more and more service types, such as mobile services, voice services, video services, network games services, and network browsing services, emerge on a current IP network (that is, a packet switched network), and bandwidth requirements also become higher and higher. In order to ensure that a large number of real-time services originally running on a time division multiplexing (TDM) network can run well on the IP network, complicated service classification needs to be performed on the IP network, and the processing procedures of IP switch equipments need to be simplified as much as possible, so as to improve the processing efficiency and quality of IP switch equipments.

In a communication equipment system such as a large-scale switch or router, a switched network is necessary for connecting different line cards and simplifying equipment architecture. The switched network and line cards constitute an integrated packet switched system that implements switch of data packets. Indexes of data switch include throughput, average cell (packet) delay, cell (packet) delay jitter, cell (packet) loss rate, blocking probability, and so on. Certainly, a good switch equipment enables the throughput to be close to 100% as much as possible, and enables the average cell (packet) delay, the cell (packet) delay jitter, the cell (packet) loss rate, and the blocking probability to be as low as possible.

A current switch equipment in the network (for example, a switch or a router with a switch function) generally adopts a virtual output queue (VOQ) for data switch. The VOQ is mainly used to perform classification and queuing on received packets according to destination addresses and priorities, and each input port sets a VOQ queue for each output port. FIG. 1 is the switch architecture of an existing switch equipment. An input end (that is, an ingress end) includes multiple VOQ queues corresponding to multiple switched paths from ingress ports to egress ports. An ingress port refers to a connection port of the input end and a switch fabric, and an egress port refers to a connection port of the switch fabric and an output end. The switch fabric (SF) includes a data switching matrix and a control switching matrix. The data switching matrix is configured to establish a switch channel for a received data stream, and the control switching matrix is configured to establish a switch channel for control information (for example, information such as a switch request, authorization and a queue status). A switch procedure is as follows. The ingress end finds out a switched path from an input port to an output port according to header information of a received data stream, and then transfers the data stream to the VOQ queue corresponding to the switched path. When it is time to switch the data stream, the ingress end requests the control switching matrix of the SF to establish a physical link for the switch of the data stream, and the ingress end sends a switch request message carrying a destination address to the output end (that is, an egress end) through the physical link. The egress end locally searches for queue information of an out queue (OQ) corresponding to the destination address in the switch request message according to the received switch request message, and when the OQ queue can still accommodate data, the egress end returns token information to the ingress end through the SF, allowing the ingress end to send the data stream to the egress end. When the token information reaches the SF, the data switching matrix of the SF establishes a physical channel for subsequent switch. After receiving the token information, the ingress end sends the data stream to the egress end through the physical channel established by the SF, and the egress end stores the received data in the OQ. When the data stream is scheduled, the egress end encapsulates the data in the OQ according to the above destination address, and then sends the data to a corresponding downstream equipment.

However, because the number of cells (or packets) from an upstream equipment and the number of packets reaching a certain port of the downstream equipment cannot be predicted, in the foregoing switch structure, a large number of buffers needs to be used to store VOQs and OQs in the ingress end and the egress end. In addition, the SF needs to prepare two switching matrixes for data switch and control information switch, and the ingress end and the egress end exchange messages through the SF to determine whether the data switch is allowed, so the entire switch procedure is too complicated, and a packet loss of the ingress end is easily caused. Moreover, a situation that multiple ingress ports send data to a same egress port at the same time easily occurs in the foregoing switch architecture, which results in blocking of the egress port.

SUMMARY

Embodiments of the present disclosure provide a method for controlling data stream switch and a relevant equipment, so as to solve the problem of scale limitation on a bufferless switch structure, and reduce the delay jitter during switch processing.

In order to solve the foregoing problems, the embodiments of the present disclosure provide the following solutions.

A method for controlling data stream switch includes: obtaining, by an input end of a switch equipment, bandwidth demand information of a data stream, encapsulating in a first control cell the bandwidth demand information and the correspondence information between the bandwidth demand information and the data stream, and sending the first control cell to a switch fabric of the switch equipment; calculating, by the switch fabric, a bandwidth map (BWM) according to the bandwidth demand information, the physical bandwidth of at least one ingress port of the data stream corresponding to the bandwidth demand information, the physical bandwidth of at least one egress port of the data stream corresponding to the bandwidth demand information, and time division multiplexing (TDM) service bandwidth information, where the ingress port is a connection port of the input end and the switch fabric, and the egress port is a connection port of the switch fabric and the output end, and the TDM service bandwidth information is used to indicate the bandwidth occupied by a TDM service on the egress port; performing, by the switch fabric, sequencing processing on entries of the BWM according to a preset sequencing criterion, to obtain a bandwidth sequencing information table, encapsulating the bandwidth sequencing information table in a second control cell, and sending the second control cell to the input end, where the sequencing criterion is that no more than two ingress ports send a cell to a same egress port in a same time slot; performing, by the input end, cell even sequencing processing on the data stream according to the bandwidth sequencing information table, to obtain a cell table, where the cell table includes a sequential position of each cell in the data stream, and cells of a same data stream are distributed at intervals in terms of sequential positions; and controlling, by the input end, sending of cells of the data stream according to the cell table.

A switch equipment includes: an input device, a switch device and an output device. The input device includes: an obtaining unit, a first sending unit, a cell sequencing unit and a second sending unit. The switch device includes: a first calculation unit, a bandwidth sequencing unit and a third sending unit. The obtaining unit is configured to obtain bandwidth demand information of a data stream.

The first sending unit is configured to encapsulate in a first control cell the bandwidth demand information obtained by the obtaining unit and the correspondence information between the bandwidth demand information and the data stream, and send the first control cell to the first calculation unit.

The first calculation unit is configured to calculate a bandwidth map BWM according to the bandwidth demand information, the physical bandwidth of at least one ingress port corresponding to the bandwidth demand information, the physical bandwidth of at least one egress port of the data stream corresponding to the bandwidth demand information, and time division multiplexing TDM service bandwidth information, where the ingress port is a connection port of the input device and the switch device, the egress port is a connection port of the switch device and the output device, and the TDM service bandwidth information is used to indicate a bandwidth occupied by a TDM service on the egress port.

The bandwidth sequencing unit is configured to perform sequencing processing on entries of the BWM according to a preset sequencing criterion, to obtain a bandwidth sequencing information table, where the sequencing criterion is that no more than two ingress ports send a cell to a same egress port in a same time slot.

The third sending unit is configured to encapsulate the bandwidth sequencing information table in a second control cell, and send the second control cell to the cell sequencing unit.

The cell sequencing unit is configured to perform cell even sequencing processing on the data stream according to the bandwidth sequencing information table, to obtain a cell table, where the cell table includes a sequential position of each cell in the data stream, and sequential positions of cells of a same data stream are distributed at intervals.

The second sending unit is configured to control sending of cells of the data stream according to the cell table.

It can be seen from the foregoing description that, in the embodiments of the present disclosure, dynamic bandwidth arbitration processing is introduced into the switch fabric, that is, the BWM is calculated by obtaining the bandwidth demand information, the ingress port physical bandwidth information and the egress port physical bandwidth information to adjust a scheduling policy of the switch fabric. There is no need to construct a data switching matrix and a control switching matrix in the switch fabric, which reduces the processing complexity of the switch fabric. Meanwhile, there is no need to use a large number of buffers to store VOQs and OQs in the input end and the output end, which solves the problem of scale limitation on a bufferless switch structure. In addition, sequencing is performed on the entries of the BWM and cell even sequencing processing is performed on the sequencing information table, which avoids the problem of "many-to-one" conflict between ingress ports and egress ports, and ensures fair distribution of end-to-end switch resources and even sending of cells, thereby reducing the delay jitter during the switch processing.

BRIEF DESCRIPTION OF THE DRAWINGS

To illustrate the solutions in the embodiments of the present disclosure or in the prior art more clearly, accompanying drawings for describing the embodiments or the prior art are introduced briefly in the following. Apparently, the accompanying drawings in the following description are only some embodiments of the present disclosure, and persons of ordinary skill in the art can derive other drawings according to the accompanying drawings without making creative efforts.

FIG. 3-$a$ is a schematic diagram of a BWM in an application scenario provided in an embodiment of the present disclosure;

FIG. 3-$b$ is a schematic diagram of a bandwidth sequencing information table obtained in an application scenario provided in an embodiment of the present disclosure;

FIG. 3-$c$ is a schematic diagram of a bandwidth sequencing information table obtained in another application scenario provided in an embodiment of the present disclosure;

FIG. 4-$a$ is a schematic diagram of an array sequence table obtained in an application scenario provided in an embodiment of the present disclosure;

FIG. 4-$b$ is a schematic diagram of a cell table obtained in an application scenario provided in an embodiment of the present disclosure.

DETAILED DESCRIPTION OF THE EMBODIMENTS

Embodiments of the present disclosure provide a method for controlling data stream switch and a relevant equipment.

In order to make the objectives, features and advantages of the present disclosure more obvious and comprehensible, the solutions in the embodiments of the present disclosure are clearly and completely described in the following with reference to the accompanying drawings in the embodiments of the present disclosure. Apparently, the embodiments to be described are only part rather than all of the embodiments of the present disclosure. All other embodiments obtained by persons of ordinary skill in the art based on the embodiments of the present disclosure without making creative efforts shall fall within the protection scope of the present disclosure.

Figure 1:
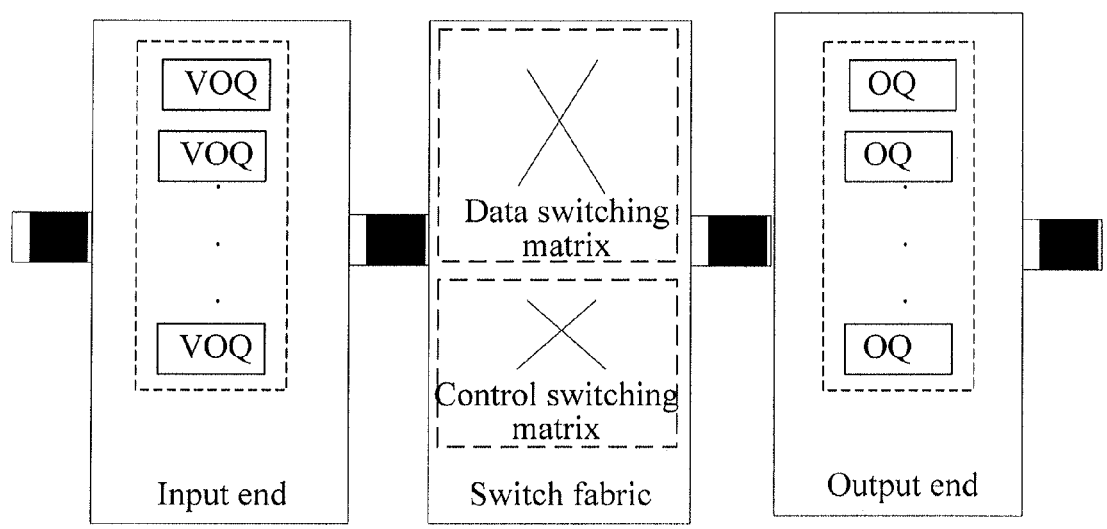
FIG. 1 is a schematic diagram of switch architecture of a switch equipment in prior art.
Figure 2:
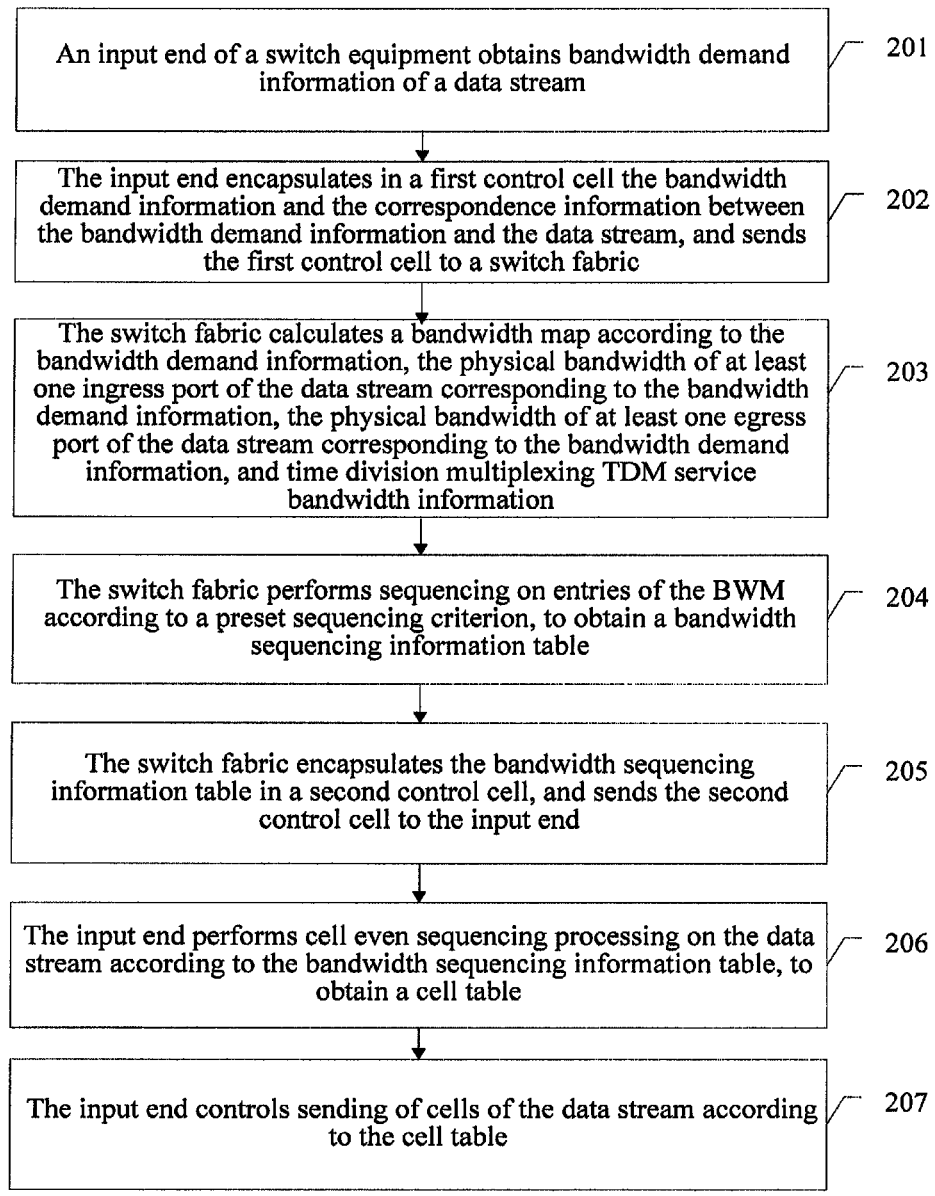
FIG. 2 is a schematic flow chart of an embodiment of a method for controlling data stream switch provided in an embodiment of the present disclosure.

A method for controlling data stream switch in an embodiment of the present disclosure is described in the following. Referring to FIG. 2, the method for controlling data stream switch in the embodiment of the present disclosure includes:

201: An input end of a switch equipment obtains bandwidth demand information of a data stream.

In the embodiment of the present disclosure, the input end (that is, an ingress end) of the switch equipment receives a data stream sent from an upstream equipment, and the input end may acquire, according to header information of the data stream and a locally-stored forwarding table, a switched path of the data stream, that is, an ingress port and an egress port of the data stream, where the ingress port refers to a connection port of the input end and a switch fabric of the switch equipment, and the egress port refers to a connection port of the switch fabric and an output end (that is, an egress end) of the switch equipment.

In the embodiment of the present disclosure, the input end obtains, in real time, the bandwidth demand information of the received data stream. When receiving multiple data streams, the input end obtains bandwidth demand information of each data stream. Steps of obtaining the bandwidth demand information of the data stream may include:

A1: Obtain a stream rate of the data stream.

A2: Obtain a length of buffered information of the data stream.

A3: Divide the length of the buffered information of the data stream by a unit time, and then add the quotient to the stream rate of the data stream, to obtain the bandwidth demand information of the data stream.

202: The input end encapsulates in a first control cell the bandwidth demand information and correspondence information between the bandwidth demand information and the data stream, and sends the first control cell to the switch fabric of the switch equipment.

In the embodiment of the present disclosure, the bandwidth demand information of each data stream may be different. The input end needs to encapsulate the bandwidth demand information, together with the correspondence information (if possible, an identifier) between the bandwidth demand information and the data stream in the first control cell, and then send the first control cell to the switch fabric of the switch equipment.

203: The switch fabric calculates a bandwidth map (BWM, Bandwidth Map) according to the bandwidth demand information, the physical bandwidth of at least one ingress port of the data stream corresponding to the bandwidth demand information, the physical bandwidth of at least one egress port of the data stream corresponding to the bandwidth demand information, and time division multiplexing (TDM, Time Division Multiplexing) service bandwidth information.

When receiving the first control cell from the input end, the switch fabric extracts the bandwidth demand information in the first control cell, acquires which data stream the bandwidth demand information belongs to from the correspondence information between the bandwidth demand information and the data stream in the first control cell, and further acquires the bandwidth demand of a corresponding data stream from the received bandwidth demand information. Therefore, a switch fabric may calculate the BWM according to the received bandwidth demand information, the physical bandwidth of the ingress port of the data stream corresponding to the bandwidth demand information, the physical bandwidth of the egress port of the data stream corresponding to the bandwidth demand information, and the TDM service bandwidth information, and output the BWM, where the TDM service bandwidth information may be obtained from the TDM service configuration information.

In the embodiment of the present disclosure, a certain time length is preset as a switch period, and the switch fabric calculates the BWM according to all bandwidth demand information received in a switch period, the physical bandwidth of at least one ingress port of the data stream corresponding to the bandwidth demand information, the physical bandwidth of at least one egress port of the data stream corresponding to the bandwidth demand information, and the TDM service bandwidth information. Certainly, time lengths of different switch periods may not be fixed, which is not limited here.

In the embodiment of the present disclosure, the BWM meets the following conditions: The sum of bandwidth demands of all data streams with a same ingress port is less than or equal to the physical bandwidth of the ingress port; the sum of bandwidth demands of all data streams with a same egress port is less than or equal to the allocatable physical bandwidth of the egress port, where the allocatable physical bandwidth of the egress port equals the difference left by subtracting the bandwidth occupied by a TDM service on the egress port and indicated by the TDM service bandwidth information from the physical bandwidth of the egress port.

In an actual application, if the sum of bandwidth demands of all data streams with a same ingress port is less than or equal to the physical bandwidth of the ingress port, and the sum of bandwidth demands of all data streams with a same egress port is less than or equal to the allocatable physical bandwidth of the egress port, bandwidth allocation may be performed according to the bandwidth demand information of each data stream, to obtain the BWM. If the sum of bandwidth demands of all data streams with a same ingress port is greater than the ingress port physical bandwidth of the ingress port, and/or the sum of bandwidth demands of all data streams with a same egress port is greater than the allocatable physical bandwidth of the egress port, bandwidth allocation may be performed according to a proportion of the bandwidth demand of each data stream to the sum of bandwidth demands of all data streams, to obtain the BWM. Alternatively, bandwidth allocation may also be performed after subtracting a preset value from the bandwidth demand of each data stream at the same time, to obtain the BWM. This is not limited here.

204: The switch fabric performs sequencing on entries of the BWM according to a preset sequencing criterion, to obtain a bandwidth sequencing information table.

In the embodiment of the present disclosure, the entries of the BWM include bandwidth information of each data stream. Multiple data streams with a same ingress port are arranged at different time slot positions of the switch period, and time slot positions where multiple data streams with different ingress ports but with a same egress port are located possibly overlap. Therefore, the switch fabric performs sequencing on the entries of the BWM according to the preset sequencing criterion, where the sequencing criterion is that no more than two ingress ports send a cell to a same egress port in a same time slot.

In an actual application, a level-1 port and a level-2 port are set at each egress port, where the level-1 port is a bus port from the switch fabric to the output end, and the level-2 port is a buffer port from the switch fabric to the output end.

In an application scenario, after receiving the BWM of the input end, the switch fabric may, starting from a first time slot of the switch period, detect statuses of ingress ports and egress ports of data streams in turn according to a numbering sequence of the ingress port and the egress port that correspond to their respective data streams in the BWM, and perform sequencing processing on the entries of the BWM according to the preset sequencing criterion. For example, it is assumed that a current switch period is 6 time slots, and an input BWM as shown in FIG. 3-*a* includes 11 data streams and bandwidth information of each data stream, which are respectively as follows: a data stream from an ingress port 1 to an egress port 1, occupying 2 time slots of the switch period;

a data stream from the ingress port 1 to an egress port 2, occupying 2 time slots of the switch period; a data stream from the ingress port 1 to an egress port 3, occupying 2 time slots of the switch period; a data stream from an ingress port 2 to the egress port 1, occupying 4 time slots of the switch period; a data stream from the ingress port 2 to the egress port 3, occupying 2 time slots of the switch period; a data stream from an ingress port 3 to the egress port 2, occupying 2 time slots of the switch period; a data stream from the ingress port 3 to the egress port 3, occupying 1 time slot of the switch period; a data stream from the ingress port 3 to an egress port 4, occupying 3 time slots of the switch period; a data stream from an ingress port 4 to the egress port 2, occupying 2 time slots of the switch period; a data stream from the ingress port 4 to the egress port 4, occupying 3 time slots of the switch period; and a data stream from the ingress port 4 to the egress port 3, occupying 1 time slot of the current switch period. Starting from the first time slot of the switch period, sequencing processing is performed on data streams corresponding to different ingress ports according to a numbering sequence of the ingress ports. A sequencing processing procedure may be as follows.

In the first time slot:

when it is detected that a level-1 port and a level-2 port of the egress port 1 are idle, arrange a sending start point of the data stream from the ingress port 1 to the egress port 1 at the first time slot, and indicate that the data stream occupies the first and the second time slots, and occupies the level-1 port of the egress port 1;

when it is detected that the level-2 port of the egress port 1 is idle, arrange a sending start point of the data stream from the ingress port 2 to the egress port 1 at the first time slot, and indicate that the data stream occupies the first, the second, the third and the fourth time slots, and occupies the level-2 port of the egress port 1;

when it is detected that the level-1 port and the level-2 port of the egress port 1 are busy, and that a level-1 port and a level-2 port of the egress port 2 are idle, arrange a sending start point of the data stream from the ingress port 3 to the egress port 2 at the first time slot, and indicate that the data stream occupies the first and the second time slots, and occupies the level-1 port of the egress port 2;

when it is detected that the level-1 port and the level-2 port of the egress port 1 are busy, and that the level-2 port of the egress port 2 is idle, arrange a sending start point of the data stream from the ingress port 4 to the egress port 2 at the first time slot, and indicate that the data stream occupies the first and the second time slots, and occupies the level-2 port of the egress port 2; and when it is detected that ingress ports of all data streams are busy, enter a next time slot.

In the second time slot:

when it is detected that the ingress ports of all the data streams are busy, enter a next time slot.

In the third time slot:

when it is detected that the ingress port 1 and the level-1 port and the level-2 port of the egress port 2 are idle, arrange a sending start point of the data stream from the ingress port 1 to the egress port 2 at the third time slot, and indicate that the data stream occupies the third and the fourth time slots, and occupies the level-1 port of the egress port 2;

when it is detected that the ingress port 3 and a level-1 port and a level-2 port of the egress port 3 are idle, arrange a sending start point of the data stream from the ingress port 3 to the egress port 3 at the third time slot, and indicate that the data stream occupies the third time slot, and occupies the level-1 port of the egress port 3;

when it is detected that the ingress port 4 and the level-2 port of the egress port 3 are idle, arrange a sending start point of the data stream from the ingress port 4 to the egress port 3 at the third time slot, and indicate that the data stream occupies the third time slot, and occupies the level-2 port of the egress port 3; and when it is detected that the ingress ports of all the data streams are busy, enter a next time slot.

In the fourth time slot:

when it is detected that the ingress port 3 and a level-1 port and a level-2 port of the egress port 4 are idle, arrange a sending start point of the data stream from the ingress port 3 to the egress port 2 at the fourth time slot, and indicate that the data stream occupies the fourth, a fifth and a sixth time slots, and occupies the level-1 port of the egress port 4;

when it is detected that the ingress port 4 and the level-2 port of the egress port 4 are idle, arrange a sending start point of the data stream from the ingress port 4 to the egress port 4 at the fourth time slot, and indicate that the data stream occupies the fourth, the fifth and the sixth time slots, and occupies the level-2 port of the egress port 4; and when it is detected that the ingress ports of all the data streams are busy, enter a next time slot.

In the fifth time slot:

when it is detected that the ingress port 1 and the level-1 port and the level-2 port of the egress port 3 are idle, arrange a sending start point of the data stream from the ingress port 1 to the egress port 3 at the fifth time slot, and indicate that the data stream occupies the fifth and the sixth time slots, and occupies the level-1 port of the egress port 3;

when it is detected that the ingress port 2 and the level-2 port of the egress port 3 are idle, arrange a sending start point of the data stream from the ingress port 2 to the egress port 3 at the fifth time slot, and indicate that the data stream occupies the fifth and the sixth time slots, and occupies the level-2 port of the egress port 3; and when it is detected that the ingress ports of all the data streams are busy, enter a next time slot.

In the sixth time slot:

when it is detected that the ingress ports of all the data streams are busy and the switch period is finished, end the sequencing processing procedure, and obtain a bandwidth sequencing information table shown in FIG. 3-*b*.

In another application scenario, level-1 ports of all egress ports may be occupied first. Assuming that a BWM received by the switch fabric is as shown in FIG. 3-*a,* a sequencing processing procedure is as follows.

In the first time slot:

when it is detected that a level-1 port of the egress port 1 is idle, arrange a sending start point of the data stream from the ingress port 1 to the egress port 1 at the first time slot, and indicate that the data stream occupies the first and a second time slots, and occupies the level-1 port of the egress port 1;

when it is detected that a level-1 port of the egress port 3 is idle, arrange a sending start point of the data stream from the ingress port 2 to the egress port 3 at the first time slot, and indicate that the data stream occupies the first and the second time slots, and occupies the level-1 port of the egress port 3;

when it is detected that a level-1 port of the egress port 2 is idle, arrange a sending start point of the data stream from the ingress port 3 to the egress port 2 at the first time slot, and indicate that the data stream occupies the first and the second time slots, and occupies the level-1 port of the egress port 2;

when it is detected that a level-1 port of the egress port 4 is idle, arrange a sending start point of the data stream from the ingress port 4 to the egress port 4 at the first time slot, and indicate that the data stream occupies the first, the second and a third time slots, and occupies the level-1 port of the egress port 4; and when it is detected that ingress ports of all data streams are busy, enter a next time slot.

In the second time slot:

when it is detected that the ingress ports of all the data streams are busy, enter a next time slot.

In the third time slot:

when it is detected that the ingress port 1 and the level-1 port of the egress port 2 are idle, arrange a sending start point of the data stream from the ingress port 1 to the egress port 2 at the third time slot, and indicate that the data stream occupies the third and a fourth time slots, and occupies the level-1 port of the egress port 2;

when it is detected that the ingress port 2 and the level-1 port of the egress port 1 are idle, arrange a sending start point of the data stream from the ingress port 2 to the egress port 1 at the third time slot, and indicate that the data stream occupies the third, the fourth, a fifth and a sixth time slots, and occupies the level-1 port of the egress port 1;

when it is detected that the ingress port 3 and the level-1 port of the egress port 3 are idle, arrange a sending start point of the data stream from the ingress port 3 to the egress port 3 at the third time slot, and indicate that the data stream occupies the third time slot, and occupies the level-1 port of the egress port 3; and when it is detected that the ingress ports of all the data streams are busy, enter a next time slot.

In the fourth time slot:

when it is detected that the ingress port 3 and the level-1 port of the egress port 4 are idle, arrange a sending start point of the data stream from the ingress port 3 to the egress port 4 at the fourth time slot, and indicate that the data stream occupies the fourth, the fifth and the sixth time slots, and occupies the level-1 port of the egress port 4;

when it is detected that the ingress port 4 and the level-1 port of the egress port 3 are idle, arrange a sending start point of the data stream from the ingress port 4 to the egress port 3 at the fourth time slot, and indicate that the data stream occupies the fourth time slot, and occupies the level-1 port of the egress port 3; and when it is detected that the ingress ports of all the data streams are busy, enter a next time slot.

In the fifth time slot:

when it is detected that the ingress port 1 and the level-1 port of the egress port 3 are idle, arrange a sending start point of the data stream from the ingress port 1 to the egress port 3 at the fifth time slot, and indicate that the data stream occupies the fifth and the sixth time slots, and occupies the level-1 port of the egress port 3;

when it is detected that the ingress port 4 and the level-1 port of the egress port 2 are idle, arrange a sending start point of the data stream from the ingress port 4 to the egress port 2 at the fifth time slot, and indicate that the data stream occupies the fifth and the sixth time slots, and occupies the level-1 port of the egress port 2; and when it is detected that the ingress ports of all the data streams are busy, enter a next time slot.

In the sixth time slot:

when it is detected that the ingress ports of all the data streams are busy and the switch period is finished, end the sequencing processing procedure, and obtain a bandwidth sequencing information table shown in FIG. 3-*c*.

Certainly, under a precondition that no more than two ingress ports send a cell to the same egress port in the same time slot, sequencing processing may be performed on the BWM in other sequencing manners, which is not limited here.

205: The switch fabric encapsulates the bandwidth sequencing information table in a second control cell, and sends the second control cell to the input end.

206: The input end performs cell even sequencing processing on the data stream according to the bandwidth sequencing information table, to obtain a cell table.

When receiving the second control cell from the switch fabric, the input end extracts the bandwidth sequencing information table in the second control cell and then performs cell even sequencing processing on the data stream in the bandwidth sequencing information table, to obtain the cell table. The cell table includes a sequential position of each cell of each data stream, and sequential positions of cells of a same data stream are distributed at intervals.

In the embodiment of the present disclosure, a total of cells expected to be sent in the current switch period may be divided into multiple arrays, so the number of time slots included in each array is equal to the total of the cells/the number of the arrays. Sequencing is performed on each array according to a set method, so that adjacent time slots of a same array have an interval of (M−1) sequential positions, where M is equal to the number of the arrays. Starting from a first array, according to an array sequence table obtained by sequencing, cells of each data stream are filled in turn into sequential positions where time slots of each array are located.

In an application scenario of the embodiment of the present disclosure, cell even sequencing processing may be performed on the data stream by adopting a manner of dividing the arrays through negative carry, and a sequencing processing procedure is as follows.

A total N of cells expected to be sent in the switch period are divided into $2^L$ arrays, so each array includes $N/2^L$ time slots, where L is an integer greater than 1. Starting from an L-bit binary number which equals 0, carry from a high bit to a low bit is performed in turn by adopting a negative carry manner, sequencing is performed on the decimal values of sequentially-obtained $2^L$ L-bit binary numbers where the decimal values are used in turn as sequential positions of first time slots of the arrays, and sequencing is performed on remaining time slots of the arrays according to a sequence relation of the sequential positions of the first time slots of the arrays, to obtain an array sequence table. Starting from a first time slot of the first array, according to a criterion that all time slots of a single array are first completely filled, all cells of each data stream in the bandwidth sequencing information table are filled in turn into sequential positions where time slots of a corresponding array are located, until all cells of all data streams in the bandwidth sequencing information table are completely filled, where there is one-to-one correspondence between the cells and the time slots.

For example, it is assumed that a total of the cells expected to be sent in the current switch period is 16. The 16 cell units are divided into 8 arrays (that is, L is equal to 3), it is indicated in the bandwidth sequencing information table that a data stream 1 includes 8 cells, and a data stream 2 includes 4 cells. Sequential positions of the arrays are described by using a 3-bit binary number ($b_2$ $b_1$ $b_0$), and a binary negative carry table shown in Table 1 may be obtained by adopting a negative carry manner.

TABLE 1

| $b_2$ | $b_1$ | $b_0$ | Array | Sequential Position |
|---|---|---|---|---|
| 0 | 0 | 0 | First array | 0 |
| 1 | 0 | 0 | Second array | 4 |
| 0 | 1 | 0 | Third array | 2 |
| 1 | 1 | 0 | Fourth array | 6 |
| 0 | 0 | 1 | Fifth array | 1 |
| 1 | 0 | 1 | Sixth array | 5 |
| 0 | 1 | 1 | Seventh array | 3 |
| 1 | 1 | 1 | Eighth array | 7 |

Sequencing may be performed on the 8 arrays according to the binary negative carry table shown in Table 1, to obtain an array sequence table shown in FIG. 4-a. Sequential positions of the first time slots of the arrays are distributed as shown in Table 1, and sequential positions of the second time slots of the arrays are distributed according to a sequence relation of the sequential positions of the first time slots of the arrays.

Sequencing is performed on the cells of the data stream 1 and the data stream 2 according to the obtained array sequence table, and a procedure may be as follows: input bandwidth information (the data stream 1=8, the data stream 2=4) of the data stream 1 and the data stream 2; judge whether the data streams in the bandwidth sequencing information table are all allocated time slots, and if yes, the sequencing procedure is ended; if no, data streams that are not allocated time slots are extracted in turn according to the bandwidth sequencing information table, and sequencing is performed on the extracted data streams. Starting from the first time slot of the first array, according to the criterion that all the time slots of a single array are first completely filled, all the cells of the data stream 1 and the data stream 2 are filled into sequential positions where time slots of corresponding arrays are located, to obtain a cell table shown in FIG. 4-b. The cells of the data stream 1 occupy two time slots (sequential positions are 0 and 8) of the first array, two time slots (sequential positions are 4 and 12) of a second array, two time slots (sequential positions are 2 and 10) of a third array, and two time slots (sequential positions are 6 and 14) of the fourth array in turn; therefore, the sequential positions occupied by the data stream 1 are (0, 2, 4, 6, 8, 10, 12, 14). The data stream 2 occupies two time slots (sequential positions are 1 and 9) of a fifth array and two time slots (sequential positions are 5 and 13) of a sixth array in turn; therefore, the sequential positions occupied by the data stream 2 are (1, 5, 9, 13).

It can be understood that, if the switch period is a fixed value, the input end merely needs to obtain the array sequence table in the foregoing manner in a first switch period, and may directly use the array sequence table for sequencing processing in a subsequent switch period to obtain a cell table.

207: The input end controls sending of cells of the data stream according to the cell table.

The input end sends the cells to a switch device 502 according to the sequential position of each cell in the cell table, so that the switch fabric delivers the received cells to an output device 503.

It can be seen from the foregoing description that, in the embodiment of the present disclosure, dynamic bandwidth arbitration processing is introduced into the switch fabric, that is, the BWM is calculated by obtaining the bandwidth demand information, the physical bandwidth information of the ingress port and the physical bandwidth information of the egress port to adjust a scheduling policy of the switch fabric. There is no need to construct a data switching matrix and a control switching matrix in the switch fabric, which reduces processing complexity of the switch fabric. Meanwhile, there is no need to use a large number of buffers to store VOQs and OQs in the input end and the output end, which solves the problem of scale limitation on a bufferless switch structure. In addition, sequencing is performed on the entries of the BWM and cell even sequencing processing is performed on the sequencing information table, which avoids the problem of "many-to-one" conflict between ingress ports and egress ports, and ensures fair distribution of end-to-end switch resources and even sending of the cells, thereby reducing the delay jitter during switch processing.

Figure 5:
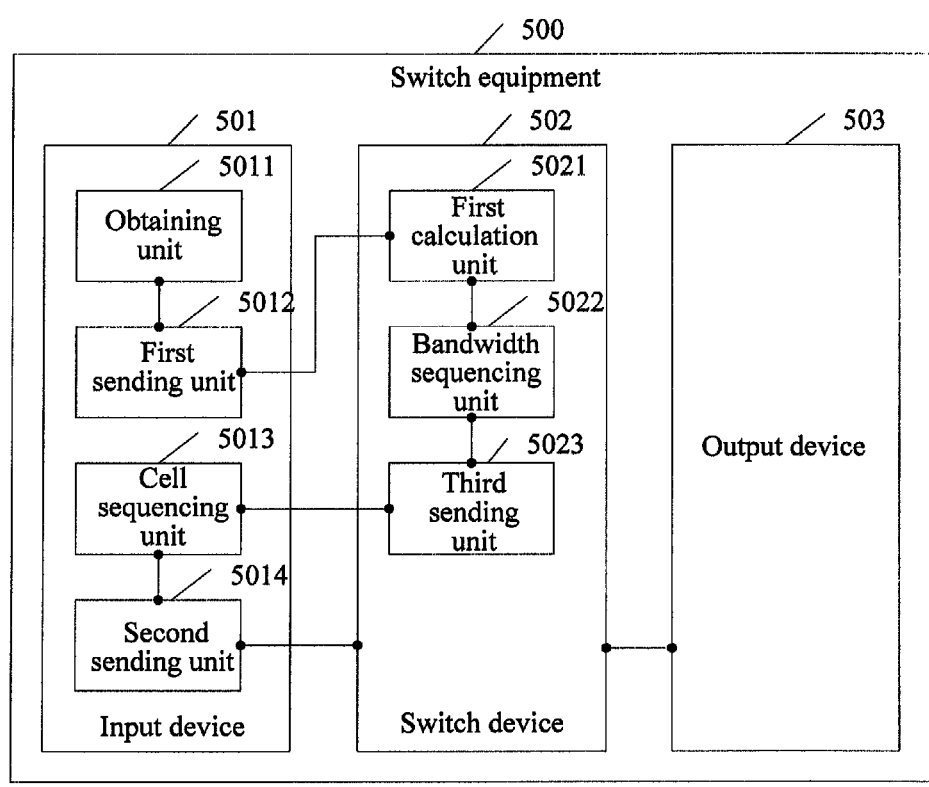
FIG. 5 is a schematic structural diagram of a switch equipment provided in an embodiment of the present disclosure.

A switch equipment in an embodiment of the present disclosure is described in the following. As shown in FIG. 5, a switch equipment 500 in the embodiment of the present disclosure includes: an input device 501, a switch device 502 and an output device 503.

The input device 501 includes: an obtaining unit 5011, a first sending unit 5012, a cell sequencing unit 5013 and a second sending unit 5014.

The switch device 502 includes: a first calculation unit 5021, a bandwidth sequencing unit 5022 and a third sending unit 5023.

The obtaining unit 5011 is configured to obtain bandwidth demand information of a data stream.

In the embodiment of the present disclosure, the obtaining unit 5011 includes:

a first obtaining sub-unit, configured to obtain a stream rate of the data stream;

a second obtaining sub-unit, configured to obtain a length of buffered information of the data stream; and a calculation obtaining sub-unit, configured to divide the length of the buffered information of the data stream by a unit time, and then add the quotient to the stream rate of the data stream, to obtain the bandwidth demand information of the data stream.

The first sending unit 5012 is configured to encapsulate in a first control cell the bandwidth demand information obtained by the obtaining unit 5011 and correspondence information between the bandwidth demand information and the data stream, and send the first control cell to the first calculation unit 5021.

In the embodiment of the present disclosure, bandwidth demand information of each data stream may be different. The first sending unit 5012 needs to encapsulate the bandwidth demand information, together with the correspondence information (if possible, an identifier) between the bandwidth demand information and the data stream in the first control cell, and then send the first control cell to the switch device of the switch equipment.

The first calculation unit 5021 is configured to calculate a BWM according to the bandwidth demand information, the physical bandwidth of at least one ingress port of the data stream corresponding to the bandwidth demand information, the physical bandwidth of at least one egress port of the data stream corresponding to the bandwidth demand information, and TDM service bandwidth information, where an ingress port is a connection port of the input device 501 and the switch device 502, an egress port is a connection port of the switch device 502 and the output device 503, and the TDM service bandwidth information is used to indicate the bandwidth occupied by a TDM service on each egress port.

In the embodiment of the present disclosure, a certain time length is preset as a switch period, and the first calculation unit 5021 calculates the BWM according to all bandwidth demand information received in a switch period, the physical bandwidth of at least one ingress port of the data stream corresponding to the bandwidth demand information, the physical bandwidth of at least one egress port of the data stream corresponding to the bandwidth demand information, and the TDM service bandwidth information. Certainly, time lengths of different switch periods may not be fixed, which is not limited here.

In the embodiment of the present disclosure, the BWM meets the following conditions: the sum of bandwidth demands of all data streams with a same ingress port is less than or equal to an ingress port physical bandwidth of the ingress port; the sum of bandwidth demands of all data streams with a same egress port is less than or equal to an allocatable physical bandwidth of the egress port, where the allocatable physical bandwidth of the egress port equals the difference left by subtracting the bandwidth occupied by a TDM service on the egress port and indicated by the TDM service bandwidth information from the physical bandwidth of the egress port.

The bandwidth sequencing unit 5022 is configured to perform sequencing processing on entries of the BWM according to a preset sequencing criterion, to obtain a bandwidth sequencing information table, where the sequencing criterion is that no more than two ingress ports send a cell to a same egress port in a same time slot.

The third sending unit 5023 is configured to encapsulate the bandwidth sequencing information table in a second control cell, and send the second control cell to the cell sequencing unit 5013.

The cell sequencing unit 5013 is configured to perform cell even sequencing processing on the data stream according to the bandwidth sequencing information table, to obtain a cell table, where the cell table includes a sequential position of each cell in the data stream, and sequential positions of cells of a same data stream are distributed at intervals.

In the embodiment of the present disclosure, the cell sequencing unit 5013 may divide a total of cells expected to be sent in the current switch period into multiple arrays, so the number of time slots included in each array is equal to the total of the cells/the number of the arrays. Sequencing is performed on each array according to a set method, so that adjacent time slots of a same array have an interval of (M−1) sequential positions, where M is equal to the number of the arrays. Starting from a first array, according to an array sequence table obtained by sequencing, cells of each data stream are filled in turn into sequential positions where time slots of each array are located.

In an application scenario of the present disclosure, the cell sequencing unit 5013 may include:

a dividing unit, configured to divide a total N of cells expected to be sent in a switch period into $2^L$ arrays, where each array includes $N/2^L$ time slots;

an array sequencing unit, configured to, starting from an L-bit binary number which equals 0, perform carry from a high bit to a low bit in turn by adopting a negative carry manner, perform sequencing on the decimal values of sequentially-obtained $2^L$ L-bit binary numbers where the decimal values are used in turn as sequential positions of first time slots of the arrays, and perform sequencing on remaining time slots of the arrays according to a sequence relation of the sequential positions of the first time slots of the arrays, to obtain an array sequence table; and a cell filling unit, configured to, starting from a first time slot of the first array, according to a criterion that all time slots of a single array are first completely filled, fill all cells of each data stream in the bandwidth sequencing information table in turn into sequential positions where time slots of a corresponding arrays are located, until all cells of all data streams in the bandwidth sequencing information table are completely filled, where there is one-to-one correspondence between the cells and the time slots.

The second sending unit 5014 is configured to control sending of cells of the data stream according to the cell table.

The second sending unit 5014 sends the cells to the switch device 502 according to the sequential position of each cell in the cell table, so that the switch device delivers the received cells to the output device 503.

It should be noted that, the input device 501, the switch device 502 and the output device 503 in this embodiment may be used as the input end, the switch fabric and the output end in the foregoing method embodiment, to implement all the solutions in the foregoing method embodiment. Functions of various functional modules may be implemented according to the method in the foregoing method embodiment. Reference may be made to the relevant description in the foregoing embodiment for a specific implementation process, and the details are not repeatedly described here.

It can be seen from the foregoing description that, in the embodiment of the present disclosure, dynamic bandwidth arbitration processing is introduced into the switch device of the switch equipment, that is, the BWM is calculated by obtaining the bandwidth demand information, the physical bandwidth information of the ingress port and the physical bandwidth information the egress port to adjust a scheduling policy of the switch device. There is no need to construct a data switching matrix and a control switching matrix in the switch device, which reduces processing complexity of the switch device. Meanwhile, there is no need to use a large number of buffers to store VOQs and OQs in the input device and the output device, which solves the problem of scale limitation on a bufferless switch structure. In addition, sequencing is performed on the entries of the BWM and cell even sequencing processing is performed on the sequencing information table, which avoids the problem of "many-to-one" conflict between ingress ports and egress ports, and ensures fair distribution of end-to-end switch resources and even sending of the cells, thereby reducing a delay jitter during switch processing.

The foregoing describes the method for controlling data stream switch and the relevant equipment provided by the present disclosure in detail. Persons of ordinary skill in the art can make variations and modifications to the present disclosure in terms of specific implementation manners and application scopes according to the idea of the present disclosure. In conclusion, the content of the description shall not be construed as a limitation on the present disclosure.

What is claimed is:

1. A method for controlling data stream switch, comprising:

obtaining, by an input end of a switch equipment, bandwidth demand information of a data stream, encapsulating in a first control cell the bandwidth demand information and correspondence information between the bandwidth demand information and the data stream, and sending the first control cell to a switch fabric of the switch equipment;

calculating, by the switch fabric, a bandwidth map (BWM) according to the bandwidth demand information, the physical bandwidth of at least one ingress port of the data stream corresponding to the bandwidth demand information, the physical bandwidth of at least one egress port of the data stream corresponding to the bandwidth demand information, and time division multiplexing (TDM) service bandwidth information, wherein the ingress port is a connection port of the input end and the switch fabric, and the egress port is a connection port of the switch fabric and the output end, and the TDM service bandwidth information is used to indicate the bandwidth occupied by a TDM service on the egress port;

performing, by the switch fabric, sequencing processing on entries of the BWM according to a preset sequencing criterion, to obtain a bandwidth sequencing information table, encapsulating the bandwidth sequencing information table in a second control cell, and sending the second control cell to the input end, wherein the sequencing criterion comprises that no more than two ingress ports send a cell to a same egress port in a same time slot;

performing, by the input end, cell even sequencing processing on the data stream according to the bandwidth sequencing information table, to obtain a cell table, wherein the cell table comprises a sequential position of each cell in the data stream, and cells of a same data stream are distributed at intervals in terms of sequential positions; and controlling, by the input end, sending of cells of the data stream according to the cell table.

2. The method according to claim 1, wherein
obtaining the bandwidth demand information of a data stream comprises:
obtaining a stream rate of the data stream;
obtaining a length of buffered information of the data stream; and
dividing the length of the buffered information of the data stream by a unit time, and then adding the quotient to the stream rate of the data stream, to obtain the bandwidth demand information of the data stream.

3. The method according to claim 1, wherein
the BWM meets the at least one of the following conditions:
a sum of bandwidth demands of all data streams with a same ingress port is less than or equal to the physical bandwidth of the ingress port; and
a sum of bandwidth demands of all data streams with a same egress port is less than or equal to the allocatable physical bandwidth of the egress port, wherein the allocatable physical bandwidth of the egress port equals the difference left by subtracting the bandwidth occupied by a TDM service on the egress port and indicated by the TDM service bandwidth information from the physical bandwidth of the egress port.

4. The method according to claim 1, wherein
calculating a bandwidth map BWM according to the bandwidth demand information, the physical bandwidth of at least one ingress port of the data stream corresponding to the bandwidth demand information, the physical bandwidth of at least one egress port of the data stream corresponding to the bandwidth demand information, and time division multiplexing TDM service bandwidth information comprises:
using a preset time length as a switch period, and calculating the BWM according to all bandwidth demand information received in a switch period, the physical bandwidth of at least one ingress port of the data stream corresponding to the bandwidth demand information, the physical bandwidth of at least one egress port of the data stream corresponding to the bandwidth demand information, and the time division multiplexing TDM service bandwidth information.

5. The method according to claim 1, wherein
performing the cell even sequencing processing on the data stream according to the bandwidth sequencing information table comprises:

dividing a total N of cells expected to be sent in the switch period into $2^L$ arrays, wherein each array comprises $N/2^L$ time slots, and L is an integer greater than 1;

starting from an L-bit binary number which equals 0, performing carry from a high bit to a low bit in turn by adopting a negative carry manner to sequentially obtain $2^L$ L-bit binary numbers, performing sequencing on the decimal values of the sequentially-obtained $2^L$ L-bit binary numbers to obtain sequenced decimal values, using the sequenced decimal values in turn as sequential positions of first time slots of the arrays, and performing sequencing on remaining time slots of the arrays according to a sequence relation of the sequential positions of the first time slots of the arrays, to obtain an array sequence table; and starting from a first time slot of a first array, according to a criterion that all time slots of a single array are first completely filled, filling all cells of each data stream in the bandwidth sequencing information table in turn into sequential positions where time slots of the arrays are located, until all cells of all data streams are completely filled, wherein there is one-to-one correspondence between the cells and the time slots.

6. A switch equipment, comprising:
an input device, a switch device, and an output device;
wherein the input device comprises: an obtaining unit, a first sending unit, a cell sequencing unit, and a second sending unit;
the switch device comprises: a first calculation unit, a bandwidth sequencing unit, and a third sending unit;
the obtaining unit is configured to obtain bandwidth demand information of a data stream;
the first sending unit is configured to encapsulate in a first control cell the bandwidth demand information obtained by the obtaining unit and correspondence information between the bandwidth demand information and the data stream, and send the first control cell to the first calculation unit;
the first calculation unit is configured to calculate a bandwidth map BWM according to the bandwidth demand information, the physical bandwidth of at least one ingress port corresponding to the bandwidth demand information, the physical bandwidth of at least one egress port of the data stream corresponding to the bandwidth demand information, and time division multiplexing TDM service bandwidth information, wherein the ingress port is a connection port of the input device and the switch device, the egress port is a connection port of the switch device and the output device, and the TDM service bandwidth information is used to indicate a bandwidth occupied by a TDM service on the egress port;
the bandwidth sequencing unit is configured to perform sequencing processing on entries of the BWM according to a preset sequencing criterion, to obtain a bandwidth sequencing information table, wherein the sequencing criterion comprises that no more than two ingress ports send a cell to a same egress port in a same time slot;
the third sending unit is configured to encapsulate the bandwidth sequencing information table in a second control cell, and send the second control cell to the cell sequencing unit;
the cell sequencing unit is configured to perform cell even sequencing processing on the data stream according to the bandwidth sequencing information table, to obtain a cell table, wherein the cell table comprises a sequential position of each cell in the data stream, and sequential positions of cells of a same data stream are distributed at intervals; and the second sending unit is configured to control sending of cells of the data stream according to the cell table.

7. The switch equipment according to claim 6, wherein the obtaining unit comprises:
a first obtaining sub-unit, configured to obtain a stream rate of the data stream;
a second obtaining sub-unit, configured to obtain a length of buffered information of the data stream; and
a calculation obtaining sub-unit, configured to divide the length of the buffered information of the data stream by a unit time, and then add the quotient to the stream rate of the data stream, to obtain the bandwidth demand information of the data stream.

8. The switch equipment according to claim 6, wherein the BWM calculated by the first calculation unit meets at least one of the following conditions:
a sum of bandwidth demands of all data streams with a same ingress port is less than or equal to the physical bandwidth of the ingress port; and
a sum of bandwidth demands of all data streams with a same egress port is less than or equal to the allocatable physical bandwidth of the egress port, wherein the allocatable physical bandwidth of the egress port equals the difference left by subtracting the bandwidth occupied by a TDM service on the egress port and indicated by the TDM service bandwidth information from the physical bandwidth of the egress port.

9. The switch equipment according to claim 6, wherein the first calculation unit is configured to use a preset time length as a switch period, and calculate the BWM according to all bandwidth demand information received in a switch period, the physical bandwidth of at least one ingress port of the data stream corresponding to the bandwidth demand information, the physical bandwidth of at least one egress port of the data stream corresponding to the bandwidth demand information, and the time division multiplexing TDM service bandwidth information.

10. The switch equipment according to claim 6, wherein the cell sequencing unit comprises:
a dividing unit, configured to divide a total N of cells expected to be sent in the switch period into $2^L$ arrays, wherein each array comprises $N/2^L$ time slots, and L is an integer greater than 1;
an array sequencing unit, configured to, starting from an L-bit binary number being completely 0, perform carry from a high bit to a low bit in turn by adopting a negative carry manner to sequentially obtain $2^L$ L-bit binary numbers, perform sequencing on the decimal values of sequentially-obtained $2^L$ L-bit binary numbers to obtain sequenced decimal values, use the sequenced decimal values in turn as sequential positions of first time slots of the arrays, and perform sequencing on remaining time slots of the arrays according to a sequence relation of the sequential positions of the first time slots of the arrays, so as to obtain an array sequence table; and
a cell filling unit, configured to, starting from a first time slot of a first array, according to a criterion that all time slots of a single array are first completely filled, fill all cells of each data stream in the bandwidth sequencing information table in turn into sequential positions where time slots of the arrays are located, until all cells of all data streams are completely filled, wherein the cells one-to-one correspond to the time slots.

* * * * *